Dec. 11, 1928.
G. W. SMITH
DEPTH MEASURING DEVICE
Filed Aug. 16, 1927
1,695,033
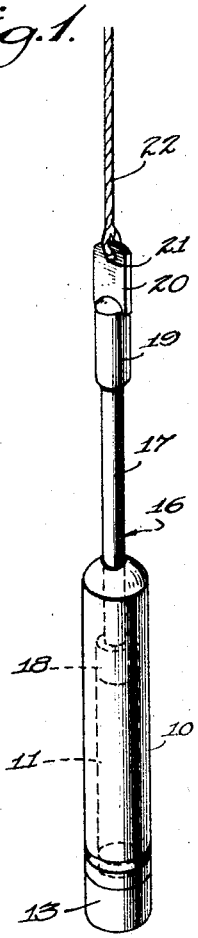
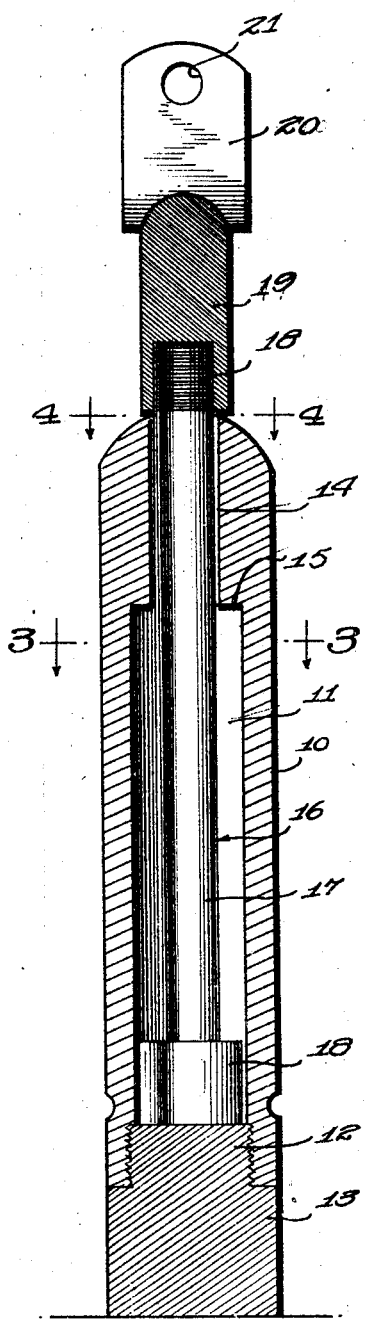
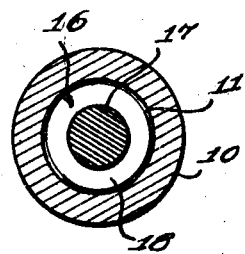
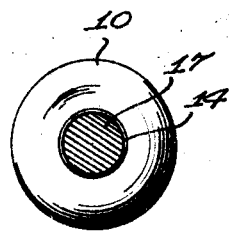
Inventor
George W. Smith
By G. W. Earnshaw
Attorney Patented Dec. 11, 1928.

1,695,033

UNITED STATES PATENT OFFICE.

GEORGE W. SMITH, OF SISTERSVILLE, WEST VIRGINIA.

DEPTH-MEASURING DEVICE.

Application filed August 16, 1927. Serial No. 213,377.

This invention relates to depth measuring devices and more particularly to a device adapted to be lowered into a well or the like by flexible suspension means, and to indicate to the operator when the bottom of the well is reached.

An important object of the invention is to provide a device of extremely simple construction which is adapted to be attached to a flexible suspension means, such as a cable or the like, and to be lowered into a well whereby a slight jarring will be transmitted through the suspension means when the bottom of the well is reached, to permit the operator to measure the depth of the hole.

A further object is to provide a device of the above mentioned character which is formed of a pair of relatively slidable members which are adapted to move with respect to each other when the bottom of the hole is reached, to transmit a slight jarring action to the suspension means to indicate that the bottom of the hole has been reached whereby the operator is permitted to measure the depth of the hole.

A further object is to provide a device of the above mentioned character including a barrel, having a lower head, and a plunger mounted to reciprocate within the barrel and adapted to support the latter while the device is being lowered into the hole, the upper end of the plunger projecting beyond the barrel and adapted for connection with flexible suspension means, the lower end of the barrel being adapted to contact with and rest upon the bottom of the hole, whereby continued downward movement of the plunger will cause the lower end of the latter to contact solidly with the lower head to transmit a slight jar to the flexible suspension means to permit the operator to ascertain when the bottom of the hole has been reached. Other objects and advantages of the invention will become apparent during the course of the following description:

In the drawings I have shown one embodiment of the invention. In this showing:

Figure 1 is a prospective view of the device,

Figure 2 is a central vertical sectional view,

Figure 3 is a detail section on line 3—3 of Figure 2, and

Figure 4 is a similar view on line 4—4 of Figure 2.

Referring to the drawings, the numeral 10 designates the body of the device which is made in the form of a cylindrical barrel, having a relatively large axial bore 11 extending throughout a substantial portion of its length. The lower end of the member is internally threaded to receive the upwardly projecting externally threaded portion 12 of a lower base 13. The upper end of the member is provided with a reduced axial opening 14 communicating with the bore 11, the upper end of the latter terminating in the shoulder 15.

Referring to Figure 2, the numeral 16 designates a plunger as a whole including the shank portion 17 and a lower enlarged portion 18. The shank 17 is adapted to reciprocate in the opening 14, while the enlarged portion 18 is adapted to reciprocate in the bore 11. The upper end of the shank 17 is threaded as at 18 for connection with the connecting member 19. The latter member is provided at its upper end with a flattened portion 20, having an opening 21 therethrough. The lower end of a cable 22 or other flexible suspension means is adapted for connection in the opening 21, as clearly shown in Figure 1.

The operation of the device is as follows:

The device is readily assembled by inserting a plunger into the barrel from the lower end thereof, whereupon the head 13 is screwed into position. The connecting member 19 is then attached to the upper end of the shank 17, and the cable 22 is secured in the opening 21. When it is desired to determine the depth of a hole, such as a water, gas or oil well, the device is lowered into the hole by means of the cable 22. It will be apparent that when the device is suspended from the cable, the barrel will drop to its lowermost position as indicated in Figure 1, in which position the head 18 of the plunger will contact with the shoulder 15 to support the barrel. The device is lowered into the hole until the base 13 contacts with the bottom of the hole, whereupon the barrel will be supported against downward movement. Continued lowering of the cable 22 will cause the plunger to move downwardly with respect to the barrel. This movement continues until the head 18 contacts solidly with the base 13, whereupon a sufficient jarring action will be transmitted through the cable 22 to indicate to the operator that the bottom of the hole has been reached. It is thereupon a simple matter to determine the depth of the hole merely by measuring the length of the device and the length of the cable. After this has been done, the device is ready to be withdrawn from the well or other hole. The device as a whole is relatively heavy to permit it to be readily dropped into the hole, and the parts of the device, which are relatively movable with respect to the barrel, are of sufficient weight to transmit the jarring action referred to.

It is to be understood that the form of the invention herewith shown and described is to be taken as a preferred example of the same, and that various changes in the shape, size and arrangement of parts may be made without departing from the spirit of the invention or the scope of the subjoined claim.

I claim:

A device of the character described comprising a barrel having a relatively large bore of substantial length intermadiate its ends and provided with a relatively small axial opening in its upper end communicating with said bore, a base carried by the lower end of said barrel and having an upper face forming the lower end of said bore, a shank adapted to reciprocate in said axial opening and projecting above said barrel, a relatively large head carried by the lower end of said shank and adapted to reciprocate in said bore, a connecting member secured to the projecting portion of said shank, and a flexible element secured to the upper end of said connecting member, said head being movable upwardly whereby it is adapted to contact with the upper end of said bore to support said barrel and being movable downwardly whereby it is adapted to contact with the lower end of said bore to transmit a jarring action to said flexible element.

In testimony whereof I affix my signature.

GEORGE W. SMITH.